Sept. 5, 1950 — H. SIESHOLTZ — 2,521,546
SHOCK ABSORBING UNIT
Filed June 13, 1949
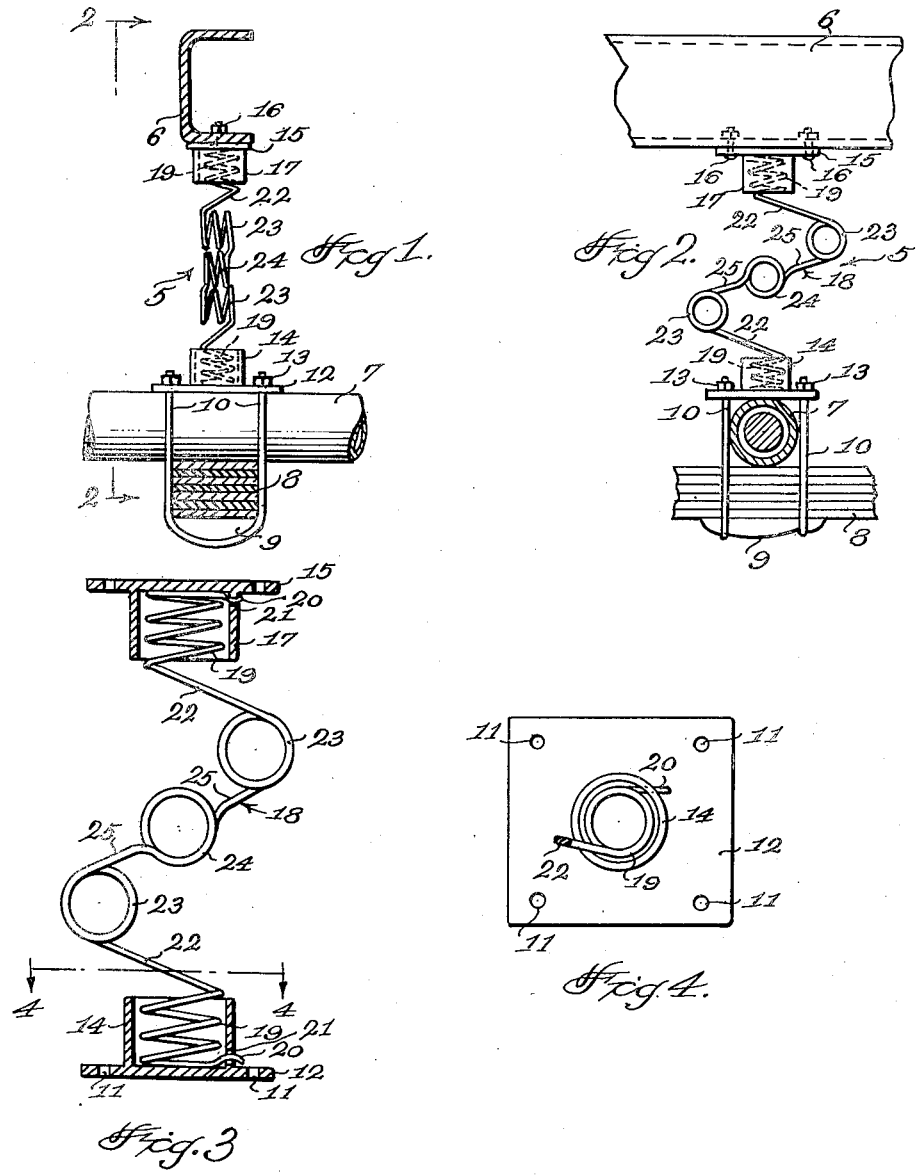
Inventor
Herbert Siesholtz
By John N. Randolph
Attorney Patented Sept. 5, 1950

2,521,546

UNITED STATES PATENT OFFICE 2,521,546

SHOCK ABSORBING UNIT

Herbert Siesholtz, Allentown, Pa.

Application June 13, 1949, Serial No. 98,820

6 Claims. (Cl. 267—26)

This invention relates to a resilient shock absorbing means adapted to be interposed between parts which are displaceable toward and away from one another for yieldably cushioning such movement of the parts in either direction to thereby function as a spring support and shock absorber.

Another object of the invention is to provide a spring support and shock absorber adapted to be employed as an auxiliary unit with a conventional vehicle spring and to be interposed between a vehicle axle and an adjacent vehicle frame portion for assisting the spring in cushioning forces tending to displace the axle toward the frame and for resisting the rebound of the axle under the impetus of the stressed spring to thereby assist in absorbing shocks transmitted to the vehicle frame by the axle and for slowing down and cushioning the rebound of the axle or frame, either in a direction away from the other.

Still a further object of the invention is to provide an auxiliary spring and shock absorber which will resist lateral movement of parts relatively to one another, between which the unit is disposed and to which said unit is secured.

Various other objects and advantages of the invention will hereinafter become more fully apparent from the following description of the drawing illustrating a preferred embodiment thereof, and wherein:

Figure 1 is a fragmentary transverse sectional view of a portion of a motor vehicle showing the invention in end elevation applied thereto between a portion of the vehicle frame and a portion of the vehicle axle;

Figure 2 is a view taken substantially at a right angle to Figure 1, as indicated by the line 2—2 of Figure 1, and showing the invention in side elevation;

Figure 3 is an enlarged fragmentary side elevational view, partly in vertical section, of the auxiliary spring and shock absorber unit, and Figure 4 is a horizontal sectional view thereof taken substantially along a plane as indicated by the line 4—4 of Figure 3.

Referring more specifically to the drawing for the purpose of illustrating one preferred application and use of the auxiliary spring and shock absorbing unit, designated generally 5 and comprising the invention, a portion of one of the side beams 6 of a vehicle frame has been illustrated in Figures 1 and 2 and a portion of one of the vehicle axles 7 is shown positioned therebeneath and transversely thereof. An intermediate portion of a conventional leaf spring 8 is shown fastened beneath the axle 7 by a spring saddle 9 and a pair of U-bolts 10.

Said U-bolts 10 function as a part of the spring and shock absorbing unit 5 and have their threaded upwardly extending ends projecting through openings 11 of a plate 12 which rests on the axle or axle housing 7 and which is held in position thereon by nuts 13 which engage the threaded terminals of the U-bolts 10 and which bear against the upper side of said plate 12. The plate 12 is provided with an integral centrally disposed upwardly extending socket 14.

The spring and shock absorbing unit 5 includes a similar plate 15 which is secured by at least two nut and bolt fastenings 16 to the underside of the frame member 6, directly above the plate 12 and which is provided with an integral depending socket 17.

The spring and shock absorbing unit 5 also includes a spring, designated generally 18, which is formed from a single strand of resilient wire of relatively heavy gauge having corresponding end portions defining expansion coiled springs 19 one of which seats in each of the sockets 14 and 17, as best illustrated in Figure 3. The terminals 20 of said strand preferably project outwardly from the coiled springs 19 through openings 21 in the sockets 14 and 17 for detachably retaining the coiled springs 19 in said sockets. The strand of wire forming the spring 18 includes corresponding legs 22 which project diagonally from the adjacent ends of the coiled springs 19 and which are disposed substantially parallel to one another. Said legs 22 terminate in corresponding spring coils 23 each composed of approximately two and one-half convolutions. The strand forming the spring 18 also includes an intermediate portion composed of an intermediate spring coil 24, likewise composed of approximately two and one-half convolutions and which is located approximately centrally between the convolutions at 19 and likewise approximately centrally between the convolutions 23 and which has extensions 25 projecting in opposite directions therefrom and merging with said convolutions 23. As clearly illustrated in Figure 1, the spring coils 23 and 24 have their convolutions spaced a considerable distance apart.

While the spring and shock absorbing unit 5 has been illustrated and described in connection with a motor vehicle and as an auxiliary spring for use in combination with a conventional vehicle spring 8, it will be readily apparent that the spring and shock absorbing unit 5 may be utilized as a sole spring support between parts which are disposed for movement toward and away from one another and may be utilized on trailers, wagons and other vehicles or in other connections where a resilient support is required.

From the foregoing, it will be readily apparent that when a wheel, not shown, connnected to the axle 7 strikes a hump or other raised surface tending to displace the wheel and axle upwardly, such upward movement of the axle relatively to the frame beam 6 will be resiliently resisted by the spring and shock absorbing unit 5 by the coiled springs 19 thereof being compressed into the sockets 14 and 17. As this occurs, the socket 14 will be moved toward the socket 17 causing the legs 22 to swing away from one another or toward the sockets from which they project and this movement of the legs 22 will be resisted by the spring coils 23 which will likewise be moved thereby toward the sockets, adjacent to which they are disposed. However, the displacement of the socket 14 toward the socket 17 will cause the spring coils 23 to assume a position more nearly in a horizontal plane than the position in which the spring coils 23 are disposed in Figure 3. This will produce a stress on the strand portions 25 which stress will be yieldably resisted by the intermediate spring coil 24 so that the coiled springs 19 and the spring coils 23 and 24 will all combine to absorb the shock of the movement of the axle 7 toward the frame member 6. Similarly, if the frame 6 is displaced toward the axle 7 as by a wheel of the vehicle striking a depression in a roadway, the shock of such movement will be similarly absorbed by the spring unit 5. Likewise, as the spring unit 5 returns the axle 7 and frame part 6 to their normal positions of Figures 1 and 2 the coiled springs and spring coils of the spring 18 will resume their normal positions, as seen in Figure 3 and will resist any tendency of the parts 6 and 7 to move away from one another beyond their normal positions, so that the spring unit 5 will also function as a shock absorber for absorbing and checking the rebound of the parts 6 and 7 away from each other. The open spring coils 23 and 24 will also function to resist any lateral movement of the parts 6 and 7 relatively to one another in directions from left to right or right to left of Figure 1 and said spring 18 will similarly function to yieldably resist horizontal movement of the parts 6 and 7 relatively to one another in directions from right to left or left to right, as seen in Figure 2.

Various modifications and changes are contemplated and may obviously be resorted to, without departing from the spirit or scope of the invention as hereinafter defined by the appended claims.

I claim as my invention:

1. A spring and shock absorbing unit comprising a base plate adapted to be secured to an axle, a second base plate adapted to be secured to a vehicle frame part, a socket fixed to and projecting inwardly of each base plate, said sockets being disposed in opposed relationship and opening toward one another, a composite spring formed from a single strand of relatively heavy gauge wire having substantially aligned coiled springs forming the end portions thereof, one of said coiled springs being seated in each of said sockets, said coiled springs having legs projecting from their inner ends and disposed diagonally to the axis of the coil springs, said legs being normally disposed substantially parallel, and said strand including spaced, connected spring convolutions each having one end forming an integral extension of one of said legs.

2. A spring and shock absorbing unit as in claim 1, said spring convolutions being disposed in horizontally and vertically offset relationship to one another and to the coiled springs.

3. A spring and shock absorbing unit as in claim 1, said coiled springs being yieldably disposed in said sockets and each having an end, constituting a terminal of said strand, detachably fastened to its complementary socket for detachably securing the coiled springs therein.

4. A spring and shock absorbing unit as in claim 1, said strand including an intermediate portion defining an intermediate spring coil having strand portions projecting in opposite directions from the opposite ends thereof and merging with the other ends of said spring convolutions.

5. A spring and shock absorbing unit as in claim 1, said strand including an intermediate portion defining an intermediate spring coil having strand portions projecting in opposite directions from the opposite ends thereof and merging with the other ends of said spring convolutions, said spring convolutions and said intermediate spring coil each being composed of a plurality of spaced convolutions.

6. A spring and shock absorbing unit as in claim 1, said strand including an intermediate portion defining an intermediate spring coil having strand portions projecting in opposite directions from the opposite ends thereof and merging with the other ends of said spring convolutions, said intermediate spring convolution being normally disposed between and equally spaced from said spring convolutions and being normally disposed between and equally spaced from said coiled springs.

HERBERT SIESHOLTZ.

REFERENCES CITED

The following references are of record in the file of this patent:

UNITED STATES PATENTS

| Number | Name | Date |
| --- | --- | --- |
| 446,203 | Cochennour et al. | Feb. 10, 1891 |
| 1,269,301 | Naber | June 11, 1918 |
| 1,344,593 | Naber | June 22, 1920 |